United States Patent
Mollmann (10) Patent No.: US 11,421,877 B2
(45) Date of Patent: Aug. 23, 2022

(54) VIBRATION CONTROL FOR A GAS TURBINE ENGINE

(71) Applicant: General Electric Company, Schenectady, NY (US)

(72) Inventor: Daniel Edward Mollmann, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 807 days.

(21) Appl. No.: 15/689,460

(22) Filed: Aug. 29, 2017

(65) Prior Publication Data

US 2019/0063747 A1    Feb. 28, 2019

(51) Int. Cl.
| | |
|---|---|
| F23N 5/24 | (2006.01) |
| F02C 9/00 | (2006.01) |
| F01D 25/04 | (2006.01) |
| F23M 20/00 | (2014.01) |

(52) U.S. Cl.
CPC ............. *F23N 5/245* (2013.01); *F01D 25/04* (2013.01); *F02C 9/00* (2013.01); *F23M 20/00* (2015.01); *F05D 2220/323* (2013.01); *F05D 2260/96* (2013.01); *F05D 2270/14* (2013.01); *F23N 2241/20* (2020.01); *F23R 2900/00013* (2013.01)

(58) Field of Classification Search
CPC ..... F23N 5/245; F23N 2041/20; F23M 20/00; F02C 9/00; F05D 2260/96; F05D 2270/14; F23R 2900/00013
See application file for complete search history.

(56) References Cited

U.S. PATENT DOCUMENTS

| | | | |
|---|---|---|---|
| 4,557,106 A | * 12/1985 | Ffowcs Williams | ..... F02C 9/34 431/1 |
| 4,808,863 A | 2/1989 | Andersson | |
| 5,370,340 A | 12/1994 | Pla | |
| 5,397,949 A | * 3/1995 | Guardiani | ............ F04D 29/669 310/51 |
| 6,461,144 B1 | 10/2002 | Gutmark et al. | |
| 6,464,489 B1 | 10/2002 | Gutmark et al. | |
| 7,234,305 B2 | 6/2007 | Nomura et al. | |
| 7,398,143 B2 | 7/2008 | Stothers et al. | |

(Continued)

FOREIGN PATENT DOCUMENTS

| | | |
|---|---|---|
| GB | 2406369 A | 3/2005 |
| JP | 2002/031188 A | 1/2002 |

(Continued)

OTHER PUBLICATIONS

Canadian Office Action Corresponding to Application No. 3014460 dated Jul. 16, 2019.

(Continued)

*Primary Examiner* — Ehud Gartenberg
*Assistant Examiner* — Henry Ng
(74) *Attorney, Agent, or Firm* — Dority & Manning, P.A.

(57) ABSTRACT

A method for operating a gas turbine engine includes receiving data indicative of an operational vibration within a section of the gas turbine engine; and providing electrical power to a shaker mechanically coupled to one or more components of the section of the gas turbine engine to generate a canceling vibration to reduce or minimize the operational vibration within the section of the gas turbine engine.

11 Claims, 6 Drawing Sheets

(56) References Cited

U.S. PATENT DOCUMENTS

| | | |
|---|---|---|
| 7,853,433 B2 | 12/2010 | He et al. |
| 8,919,131 B2 | 12/2014 | Singh et al. |
| 9,354,618 B2 | 5/2016 | Chandler |
| 9,376,963 B2 | 6/2016 | Soni et al. |
| 2008/0296819 A1* | 12/2008 | Fursdon ............... F16F 13/266 267/140.15 |
| 2011/0048021 A1* | 3/2011 | Slobodyanskiy ....... F01D 9/023 60/725 |
| 2012/0006028 A1* | 1/2012 | Lee ...................... F01D 9/023 60/725 |
| 2012/0102701 A1* | 5/2012 | Borufka ................. F01D 5/26 29/402.01 |
| 2012/0137690 A1* | 6/2012 | Sardeshmukh ......... F23R 3/002 60/725 |
| 2013/0291552 A1* | 11/2013 | Smith .................... F23N 5/16 60/779 |
| 2014/0238033 A1* | 8/2014 | Crothers ................ F02C 9/18 60/772 |
| 2015/0260609 A1 | 9/2015 | Vinod et al. |
| 2015/0370266 A1* | 12/2015 | Norris ................... B64C 1/40 700/280 |
| 2015/0377485 A1 | 12/2015 | Cha et al. |
| 2017/0082067 A1* | 3/2017 | Maqbool ................ F02K 7/04 |
| 2017/0096919 A1 | 4/2017 | Imfeld et al. |
| 2017/0314433 A1* | 11/2017 | You ........................ F23R 3/00 |

FOREIGN PATENT DOCUMENTS

| | | |
|---|---|---|
| JP | 2003/328778 A | 11/2003 |
| WO | WO2014/138574 A2 | 9/2014 |

OTHER PUBLICATIONS

European Search Report Corresponding to Application No. 181904921 dated Jan. 30, 2019.

* cited by examiner

VIBRATION CONTROL FOR A GAS TURBINE ENGINE

FIELD

The present subject matter relates generally to a vibration control assembly for use within a gas turbine engine, and a method for using the same.

BACKGROUND

Certain combustors in gas turbine engines may be particularly susceptible to combustion dynamics. Under certain engine operating conditions, significant transient pressure waves ("pings") can be present, particularly in an annular combustor. These pressure waves, if of sufficient magnitude, may cause one or more components within a combustion section of the engine to vibrate, the vibration potentially resulting in high cycle fatigue of such components, before the hardware would need to be replaced under normal operations.

One known approach to combustor dynamic issues can involve careful mapping of problem regimes using test engines with multiple combustor instrumentation pressure sensors. Aircraft fuel schedules may then be developed from this process and subsequently programmed into engine control to address at least certain of these problem areas. Despite this mapping, however, subtle differences between engines may still adversely affect combustion dynamics behavior. These changes may be due to parameters including manufacturing variations, engine deterioration, fuel composition, or unexpected flight conditions.

Therefore, it may be beneficial to monitor combustor dynamics during fielded operation of the engine. Moreover, the inventor of the present disclosure has discovered that in addition to simply trying to prevent vibrations due to combustor dynamics, it may be beneficial to offset such vibrations to minimize an effect of such vibrations within the combustion section of the engine.

BRIEF DESCRIPTION

Aspects and advantages of the invention will be set forth in part in the following description, or may be obvious from the description, or may be learned through practice of the invention.

In one exemplary aspect of the present disclosure, a method for operating a gas turbine engine is provided. The method includes receiving data indicative of an operational vibration within a section of the gas turbine engine; and providing electrical power to a shaker mechanically coupled to one or more components of the section of the gas turbine engine to generate a canceling vibration to reduce or minimize the operational vibration within the section of the gas turbine engine.

In certain exemplary aspects the section of the gas turbine engine is a combustion section of the gas turbine engine.

For example, in certain exemplary aspects receiving data indicative of the operational vibration within the combustion section of the gas turbine engine includes receiving data from one or more accelerometers within the combustion section of the gas turbine engine.

For example, in certain exemplary aspects the one or more accelerometers are configured to measure a vibration of one or more of a combustor liner of a combustor within the combustion section of the gas turbine engine, a fuel nozzle within the combustion section of the gas turbine engine, a fuel manifold within the combustion section of the gas turbine engine, or a combustor case within the combustion section of the gas turbine engine.

In certain exemplary aspects receiving data indicative of the operational vibration within the section of the gas turbine engine includes receiving data indicative of at least one of a frequency, an amplitude, or a phase of the operational vibration.

For example, in certain exemplary aspects providing electrical power to the shaker mechanically coupled to one or more components of the section of the gas turbine engine to generate the canceling vibration includes generating a canceling vibration that is out of phase with the operational vibration.

In certain exemplary aspects providing electrical power to the shaker mechanically coupled to one or more components of the section of the gas turbine engine includes modulating the electrical power provided to the shaker in response to the received data indicative of the operational vibration within the section of the gas turbine engine.

For example, in certain exemplary aspects modulating the electrical power provided to the shaker includes modulating at least one of a voltage of the electrical power provided to the shaker, a current of the electrical power provided to the shaker, a frequency of the electrical power provided to the shaker, or a phase of the electrical power provided to the shaker.

For example, in certain exemplary aspects modulating the electrical power provided to the shaker includes modulating the electrical power provided to the shaker using a power amplifier.

In certain exemplary aspects the section of the gas turbine engine is the combustion section of the gas turbine engine, wherein the combustion section of the gas turbine engine includes an outer combustor case, and wherein the shaker is mechanically coupled to the outer combustor case.

In certain exemplary aspects the shaker is a first shaker, wherein the canceling vibration is a first canceling vibration, and wherein the method further includes providing electrical power to a second shaker mechanically coupled to one or more components of the combustion of the gas turbine engine to generate a second canceling vibration to reduce or minimize the operational vibration within the section of the gas turbine engine.

For example, in certain exemplary aspects providing electrical power to the second shaker mechanically coupled to one or more components of the section of the gas turbine engine includes modulating the electrical power provided to the second shaker in response to the received data indicative of the operational vibration within the section of the gas turbine engine.

In an exemplary embodiment of the present disclosure, a vibration management assembly of a gas turbine engine is provided. The vibration management assembly includes a sensor configured to measure a vibration within a combustion section of the gas turbine engine when installed in the gas turbine engine and a shaker configured to be mechanically coupled to the combustion section of the gas turbine engine when installed in the gas turbine engine. The vibration management assembly also includes a controller operably connected to the sensor and to the shaker, the controller including memory and one or more processors, the memory storing instructions that when executed by the one or more processors cause the vibration management assembly to perform functions. The functions include receiving data from the sensor indicative of an operational vibration within the combustion section of the gas turbine engine; and providing electrical power to the shaker to generate a canceling vibration to reduce or minimize the operational vibration within the combustion section of the gas turbine engine.

In certain exemplary embodiments receiving data from the sensor indicative of the operational vibration within the combustion section of the gas turbine engine includes receiving data from one or more accelerometers within the combustion section of the gas turbine engine.

For example, in certain exemplary embodiments the one or more accelerometers are configured to measure a vibration of one or more of a combustor liner of a combustor within the combustion section of the gas turbine engine, a fuel nozzle within the combustion section of the gas turbine engine, a fuel manifold within the combustion section of the gas turbine engine, or a combustor case within the combustion section of the gas turbine engine.

In certain exemplary embodiments receiving data from the sensor indicative of the operational vibration within the combustion section of the gas turbine engine includes receiving data indicative of at least one of a frequency, an amplitude, or a phase of the operational vibration.

For example, in certain exemplary embodiments providing electrical power to the shaker to generate the canceling vibration includes generating a canceling vibration that is out of phase with the operational vibration.

In another exemplary embodiment of the present disclosure, a gas turbine engine is provided. The gas turbine engine includes a compressor section; a turbine section; a combustion section disposed downstream of the compressor section and upstream of the turbine section; and a vibration management assembly. The vibration management assembly includes a sensor for sensing data indicative of a vibration within one of the compressor section, the turbine section, or the combustion section of the gas turbine engine and a shaker. The shaker is mechanically coupled to one or more components of the compressor section, the turbine section, or the combustion section to generate a canceling vibration to reduce or minimize the operational vibration within the compressor section, the turbine section, or the combustion section of the gas turbine engine during operation.

In certain exemplary embodiments the sensor of the vibration management is configured as an accelerometer.

In certain exemplary embodiments the vibration management assembly further includes a plurality of sensors, and wherein the plurality of sensors include at least one of a combustor liner sensor configured to measure data indicative of a vibration of a combustor liner, a fuel nozzle sensor configured to measure data indicative of vibration of a fuel nozzle, or a combustor case sensor configured to measure data indicative of a vibration of a combustor case.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
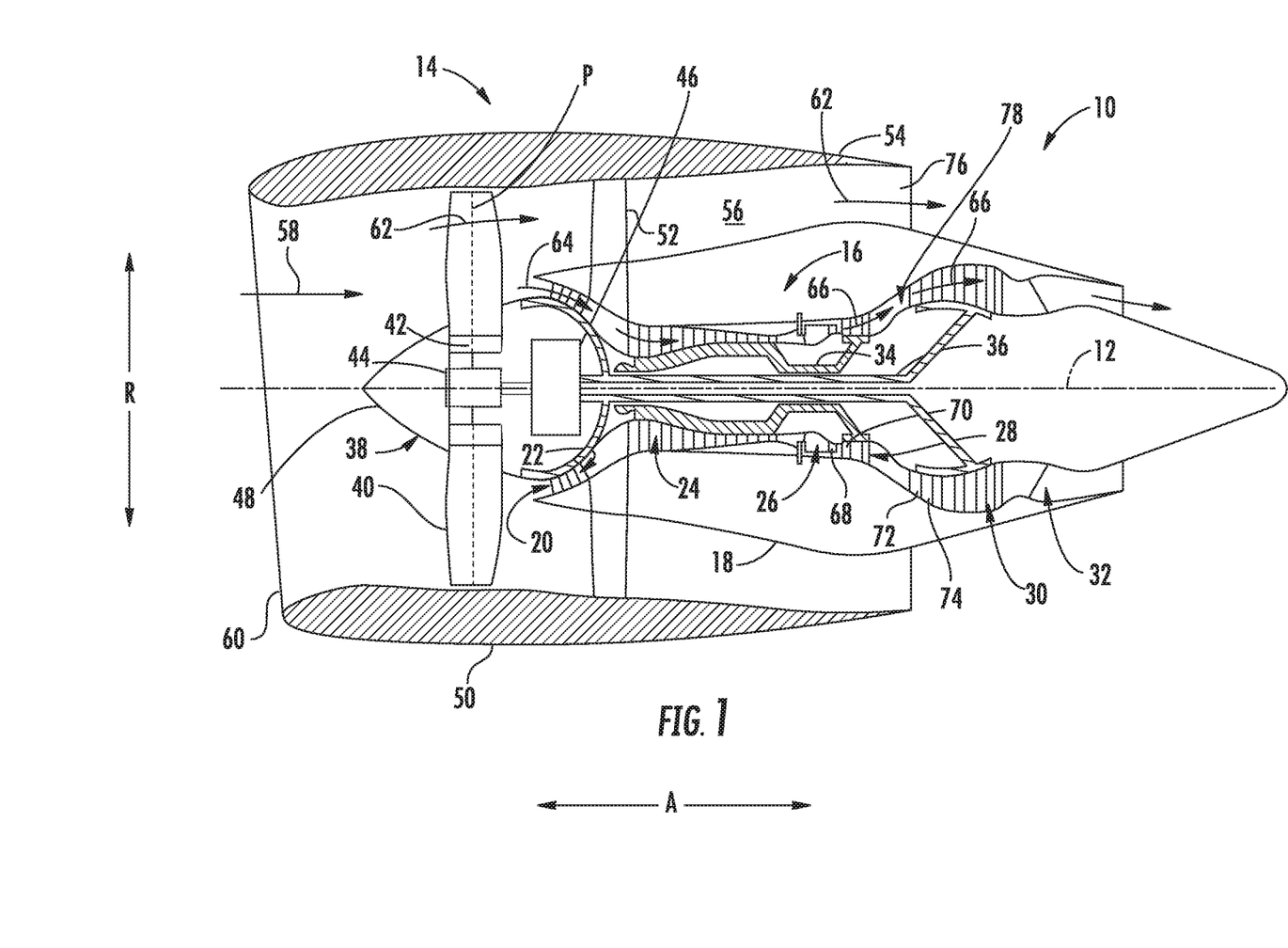
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 positioned downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 through the core turbine engine 16.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, a pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Moreover, aspects of the present disclosure may further be utilized with any other land-based gas turbine engine, such as a power generation gas turbine engine, or any aeroderivative gas turbine engine, such as a nautical gas turbine engine.

Figure 2:
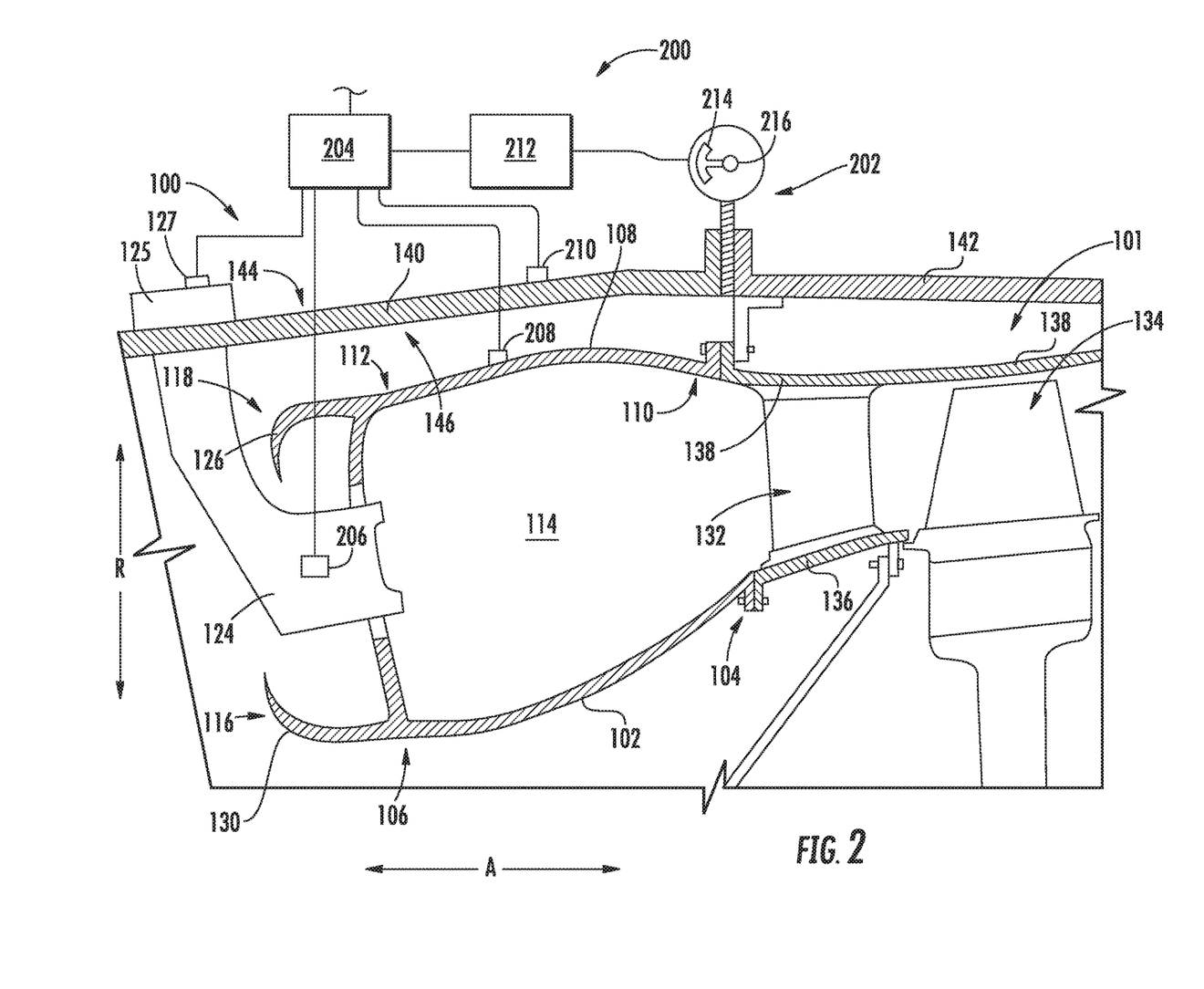
FIG. 2 is a schematic, cross-sectional view of a combustor assembly and turbine in accordance with an exemplary embodiment of the present disclosure.

Referring now to FIG. 2, a close-up, side, cross-sectional view is provided of a combustion section 100 and turbine 101 of a gas turbine engine in accordance with an exemplary embodiment of the present disclosure. In at least certain exemplary aspects, the combustion section 100 of FIG. 2 may be configured in substantially the same manner as the combustion section 26 of the exemplary turbofan engine 10 of FIG. 1, and similarly, the turbine 101 of FIG. 2 may be configured in substantially the same manner as the HP turbine 28 of the exemplary turbofan engine 10 of FIG. 1.

Figure 3:
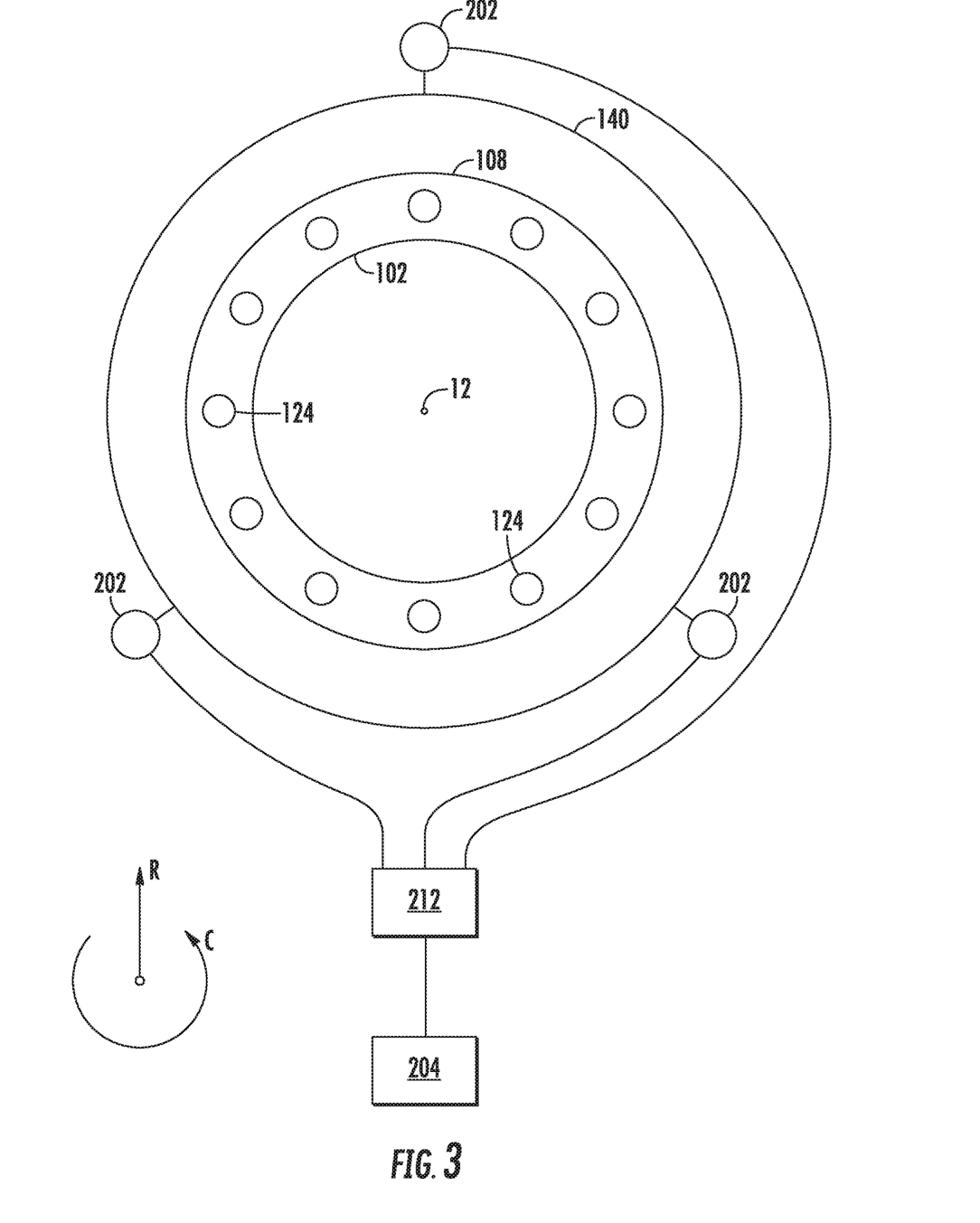
FIG. 3 is an axial view of a combustor assembly in accordance with an exemplary embodiment of the present disclosure.

As shown, the combustion section 100 generally includes a combustor assembly having an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end 112 of the outer liner 108. Further, the inner and outer dome section 116, 118 may each be formed integrally (or alternatively may be formed of a plurality of components attached in any suitable manner) and may each extend along the circumferential direction C (see FIG. 3) to define an annular shape.

For the embodiment depicted, the inner liner 102 and the outer liner 108 are each formed of a ceramic matrix composite (CMC) material, which is a non-metallic material having high temperature capability. Exemplary CMC materials utilized for such liners 102, 108 may include silicon carbide, silicon, silica or alumina matrix materials and combinations thereof. However, in other exemplary embodiments, one or both of the inner liner 102 and outer liner 108 may instead be formed of any other suitable material, such as a suitable metal material.

Additionally, it should be appreciated that in other embodiments, the combustor assembly of the combustion section 100 shown may not include the inner and/or outer dome sections 116, 118; may include separately formed inner and/or outer dome sections 116, 118 attached to the respective inner liner 102 and outer liner 108; or may have any other suitable configuration.

Referring still to FIG. 2, the combustion section 100 further includes a plurality of fuel nozzles, also referred to as fuel air mixers 124, spaced along the circumferential direction C (see FIG. 3, below) and positioned at least partially within the annular dome. More particularly, the plurality of fuel air mixers 124 are disposed at least partially between the outer dome section 118 and the inner dome section 116 along the radial direction R. Fuel is provided to the fuel air mixers 124 through a fuel manifold 125, and compressed air from a compressor section of the gas turbine engine (e.g., from an HP compressor 24 of a turbofan engine 10) flows into or through the fuel air mixers 124, where the compressed air is mixed with the fuel and ignited to create combustion gases within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section into or through one or more of the fuel air mixers 124. Again, however, in other embodiments, the annular dome may be configured in any other suitable manner.

Additionally, as is discussed above, the combustion gases flow from the combustion chamber 114 into and through the turbine 101 of the turbine section of the gas turbine engine, where a portion of thermal and/or kinetic energy from the combustion gases is extracted via sequential stages of turbine stator vanes and turbine rotor blades. As is depicted, the exemplary turbine 101 of FIG. 2 includes a first stage of turbine nozzles 132 positioned at a forward end of the turbine 101, at a location downstream of, or rather immediately downstream of, the combustion chamber 114. Additionally, the first stage of turbine nozzles 132 is positioned immediately upstream of a first stage of turbine rotor blades 134. As will be appreciated, the first stage of turbine nozzles 132 may be configured to orient the combustion gases from the combustion chamber 114 in a desired flow direction to increase a performance of the turbine 101. For the embodiment depicted, the first stage of turbine nozzles 132 includes a plurality of individual turbine nozzles spaced along the circumferential direction C (see FIG. 3) and extending generally along the radial direction R from an inner turbine liner 136 to an outer turbine liner 138. The inner and outer turbine liners 136, 138 at least partially define a portion of the core air flowpath extending through the turbine 101 of the turbine section. The outer turbine liner 138 is, for the embodiment depicted, coupled to the outer liner 108 of the combustor assembly at a forward end and extends aftwardly/downstream past the first stage of turbine rotor blades 134.

As is also depicted in FIG. 2, the gas turbine engine further includes a casing at least partially enclosing the combustor assembly, including the outer liner 108. More specifically, the gas turbine engine further includes an outer combustor case 140 at least partially enclosing the combustor assembly, as well as a turbine case 142 at least partially enclosing the outer turbine liner 138 of the turbine 101. Each of the outer combustor case 140 and turbine case 142 defines a first side 144 proximate to and facing the respective liners 108, 138 (i.e., a radially inner side), and a second side 146 opposite the first side 144 (i.e., a radially outer side).

As will be appreciated, during operation of the gas turbine engine, undesirable combustion dynamics may be generated through the continuous combustion of the fuel-air mixture provided by nozzles 124 and ignited within the combustion chamber 114. More specifically, under at least certain operating conditions transient pressure waves, if of a relevant frequency and sufficient magnitude, may result in operational vibrations of one or more components within the combustion section 100 of the gas turbine engine. In order to minimize or reduce these operational vibrations within the combustion section 100 of the gas turbine engine during operation of the gas turbine engine, the exemplary embodiment of FIG. 2 further includes a vibration management assembly 200. Notably, as used herein, the term "minimize or reduce" with reference to the operational vibrations refers to reducing the vibrations of one or more components of the combustion section 100 relative to what the vibrations of such components would be without use of the vibration management assembly. Additionally, as used herein, the term "operational vibration" refers to an actual vibration of a component during operation of the engine, which may be caused by, e.g., combustor dynamics, component imbalance, etc.

The exemplary vibration management assembly 200 depicted generally includes a sensor configured to measure data indicative of a vibration within the combustion section 100 of the gas turbine engine (i.e., when installed in the gas turbine engine), a shaker 202 configured to be mechanically coupled to the combustion section 100 of the gas turbine engine (i.e., also when installed in the gas turbine engine), and a controller 204 operably connected to the sensor and the shaker 202. Notably, in certain exemplary aspects, the controller 204 may be a separate controller, or alternatively the controller 204 may be integrated into one or more of the controller of the exemplary gas turbine engine (such as a FADEC), a controller of an aircraft to which the exemplary gas turbine engine is installed, etc. Regardless, in certain exemplary embodiments, the controller 204 may be configured in a manner similar to the exemplary control system 400 described below with reference to FIG. 8.

More specifically, for the exemplary embodiment depicted, the vibration management assembly 200 includes a plurality of sensors configured to measure data indicative of a vibration of one or more components within the combustion section 100 of the gas turbine engine. For example, the exemplary vibration management assembly 200 depicted includes a nozzle sensor 206 coupled to one of the fuel air mixers/nozzles 124 to measure data indicative of a vibration of the fuel air mixer/nozzle 124. Additionally, the vibration management assembly 200 includes a fuel manifold sensor 127 to measure data indicative of a vibration of the fuel manifold 125, a liner sensor 208 coupled to the outer liner 108 to measure data indicative of a vibration of the outer liner 108, and a combustor case sensor 210 coupled to the outer combustor case 140 to measure data indicative of a vibration of the outer combustor case 140. In at least certain exemplary embodiments, each of these sensors 206, 208, 210 may be configured as accelerometers. However, in other exemplary embodiments, any other suitable sensor may be utilized to determine a vibration of the respective component to which is attached (e.g., strain gauges, pressure sensors, etc.). For example, in other exemplary embodiments, one or more of the sensors 206, 208, 210 may be configured as pressure sensors configured to measure a pressure in or around such component, and more particularly, to measure pressure fluctuations in or around such components, such as within the combustion chamber 114. Such pressured fluctuations may be indicative of combustor dynamics, which in turn may be indicative of an operational vibration of one or more components within the combustion section 100.

Further, although the exemplary vibration management assembly 200 includes the nozzle sensor 206, liner sensor 208, and combustor case sensor 210, in other exemplary embodiments, the vibration management assembly 200 may not include each of the sensors, and further, may include one or more additional sensors not depicted configured to measure vibration of one or more other components (e.g., a pressure sensor configured to measure a pressure within, e.g., the combustion chamber 114). Moreover, it will be appreciated that the controller 204 may be configured to determine the operational vibration within the combustion section 100 of the gas turbine engine based on data received from one or more of the plurality of sensors 206, 208, 210 of the vibration management assembly 200. For example, it may be determined through, e.g., experimental data, that an actual operational vibration within the combustion section 100 of the gas turbine engine is a function of the sensed data indicative of the operational vibration from one or more of the plurality of sensors 206, 208, 210 coupled to a respective component.

Referring still to the embodiment of FIG. 2, for the embodiment depicted, the shaker 202 is mechanically coupled to the outer combustor case 140, and more specifically, is mechanically coupled to both the outer combustor case 140 and the turbine case 142. Additionally, as stated, the shaker 202 is operably coupled to the controller 204, and more specifically, the controller 204 is configured to provide electrical power to the shaker 202 during operation. More specifically, still, the exemplary vibration management assembly 200 further includes a power amplifier 212, and the controller 204 is configured to provide electrical power to the shaker 202 through the power amplifier 212. The power amplifier may be a device configured to receive an input electrical power from, e.g., the controller 204 or elsewhere, and provide an output electrical power that varies in one or more of voltage, amplitude, frequency, or phase relative to the input electrical power, based on an input received from the controller 204.

It should be appreciated, however, that although for the embodiment depicted the shaker 202 is depicted being coupled to the outer combustor case 140 at an aft location, in other exemplary embodiments, the shaker 202 may instead be coupled to the outer combustor case 140 at any other suitable location (e.g., at a location aligned along the axial direction A with one or more of the plurality of fuel nozzles 124, at a location aligned along the axial direction A with the combustion chamber 114, etc.). Moreover, although the shaker 202 is depicted positioned on the radially outer side 144 of the outer combustor case 140, in other embodiments, the shaker 202 may be coupled to the radially inner side 146 of the outer combustor case 140 and therefore positioned inward along the radial direction R of the outer combustor case 140. Additionally, in other exemplary embodiments the shaker 202 may be mechanically coupled to the fuel nozzle 124, one or more of the outer liner 108 or the liner 102, etc.

Further, still, although for the embodiment depicted, the vibration management assembly 200 is depicted including a single shaker 202, in other exemplary embodiments, the vibration management assembly 200 may further include a plurality of shakers 202. For example, referring now briefly to FIG. 3, providing a schematic view along the axial direction A of the combustion section 100 of the exemplary gas turbine engine of FIG. 2, it will be appreciated that in certain exemplary embodiments, the vibration management assembly 200 may further include a plurality of shakers 202 spaced along the circumferential direction C. For example, for the exemplary embodiment depicted in FIG. 3, the vibration management assembly 200 includes three shakers 202 spaced substantially evenly along the circumferential direction C, each shaker 202 operably connected to the controller 204 through the power amplifier 212. However, in other exemplary embodiments, the vibration management assembly 200 may include any other suitable number of shakers 202, such as two shakers 202, four shakers 202, etc., spaced in any other suitable manner, and/or coupled to any other suitable component within the combustion section 100. For example, in other exemplary embodiments, the vibration management assembly 200 may include one or more shakers 202 attached to the outer combustor case 140, the outer liner 108, one or more of the fuel nozzles 124, etc.

Referring back to FIG. 2, the term "shaker," as used herein, refers generally to a machine that is capable of creating a vibration at a determined amplitude, frequency, and/or phase in response to receiving electrical power. Accordingly, the shaker 202 may be configured as any suitable machine for generating such a vibration. For the embodiment depicted, the shaker 202 is configured as a rotary-style shaker, including a weight 214 attached to a rotor 216 which may be rotatable by an electric motor (not shown) of the shaker 202 during operation to generate a desired vibration. The electric motor may receive electrical power from the controller 204 through the power amplifier 212. In such a manner, the shaker 202 may be operated to generate a canceling vibration to reduce or minimize the operational vibration within the combustion section 100 of the gas turbine engine during operation of the gas turbine engine. The canceling vibration may be varied in one or more of frequency, amplitude, or phase through use of, e.g., the power amplifier 212, in order to more effectively cancel or reduce or minimize the operational vibration within the combustion section 100.

More specifically, the controller 204 of the vibration management assembly 200 may receive data indicative of the operational vibration within the combustion section 100 of the gas turbine engine from the one or more sensors, and in response may provide electrical power to the shaker 202 (e.g., through the power amplifier 212), such that the shaker 202 may generate a desired canceling vibration to reduce or minimize the operational vibration within the combustion section 100 of the gas turbine engine. Notably, in certain exemplary aspects, the controller 204 may modify (e.g., using the power amplifier 212) one or more of a current of the electric power provided to the shaker 202, a voltage of the electric power provided to the shaker 202, a frequency of the electric power provided to the shaker 202, and/or a phase of the electrical power provided to the shaker 202. Such may allow the controller 204 to modify certain properties of the canceling vibration generated by the shaker 202 such that the canceling vibration more effectively cancels out, reduces, or minimizes the operational vibration. Notably, such modifications of the electrical power provided to the shaker 202 may be in response to the received data indicative of the operational vibration within the combustion section 100. In such a manner, the exemplary vibration management assembly 200 may dynamically reduce or minimize the operational vibration within the combustion section 100 of the gas turbine engine during operation of the gas turbine engine.

Figure 4:
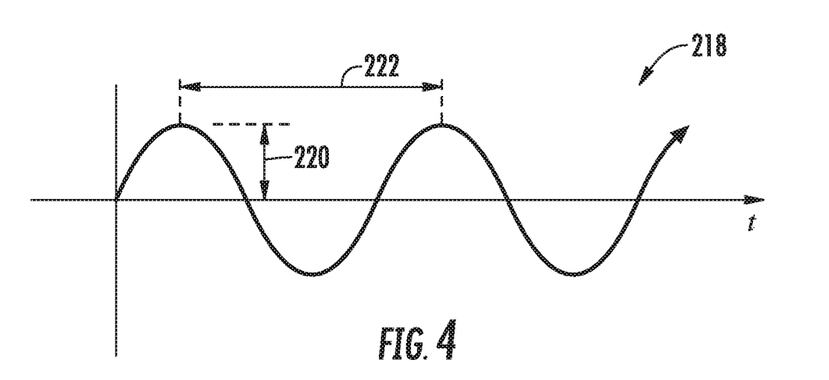
FIG. 4 is a graph of a vibration as may be sensed in a combustion section in accordance with an exemplary embodiment of the present disclosure.
Figure 5:
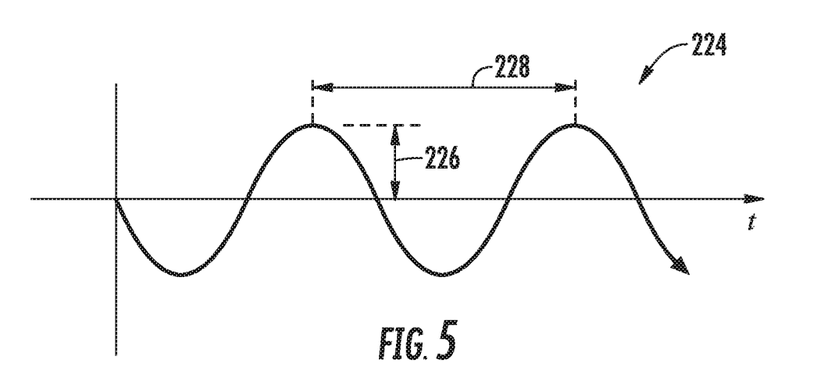
FIG. 5 is a graph of a canceling vibration as may be generated using a vibration management system in accordance with an exemplary embodiment of the present disclosure.
Figure 6:
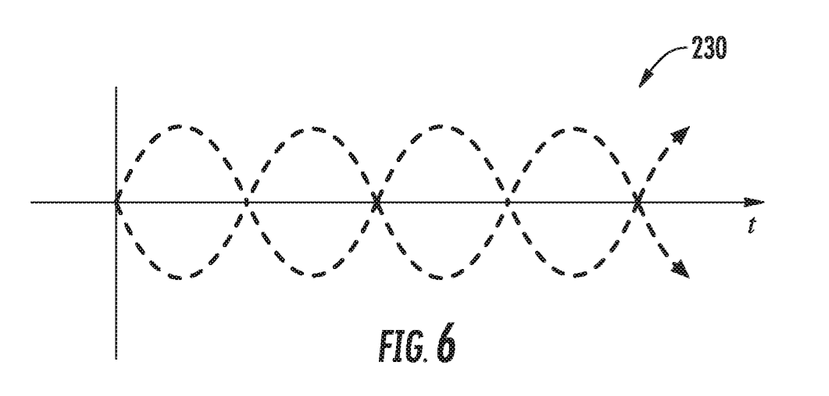
FIG. 6 is a graph overlaying a sensed vibration within a combustion section and a canceling vibration as may be generated by the exemplary vibration management system.

For example, referring generally to FIGS. 4 through 6, an exemplary aspect of the present disclosure will be briefly explained. FIG. 4 provides a graph 218 depicting operational vibration sensed within a combustion section of a gas turbine engine in accordance with an exemplary embodiment (e.g., FIGS. 1 and 2). For example, the operational vibration depicted in the graph 218 of FIG. 4 may be derived from one or more measurements sensed through a sensor, such as one or more of the exemplary nozzle sensor 206, outer liner sensor 208, or combustor case sensor 210 of the exemplary vibration management assembly 200 of FIG. 2. As is depicted, the exemplary operational vibration of FIG. 4 defines an amplitude 220 (which, as will be appreciated, may be indicative of a force of the operational vibrations) and a frequency/wavelength 222. By contrast, FIG. 5 provides a graph 224 depicting a canceling vibration provided by a shaker, such as from the shaker 202 of the exemplary vibration management assembly 200 of FIG. 2. The canceling vibration provided by the shaker of the vibration management assembly 200 also defines an amplitude 226 (which, as will be appreciated, may be indicative of a force of the canceling vibration) and a frequency/wavelength 228. Referring now to FIG. 6, a graph 230 is provided showing an overlap the operational vibration depicted in FIG. 4 with the canceling vibration depicted in FIG. 5. It will be appreciated that the canceling vibration is approximately one hundred and eighty degrees out of phase with the operational vibration, such that the canceling vibration may reduce, or minimize, or more specifically for the embodiment depicted cancel out, the operational vibration.

Accordingly, it will be appreciated that in certain exemplary embodiments, the vibration management assembly may be configured to determine an operational vibration within a combustion section of the gas turbine engine within which the vibration management assembly is installed using one or more sensors. The vibration management assembly may then provide electrical power to a shaker such that the shaker may generate a canceling vibration to reduce or minimize the operational vibration within the combustion section of the gas turbine engine. The vibration management system may modulate the electrical power provided to the shaker, such that the shaker generates a canceling vibration of a desired amplitude, frequency, and/or phase to provide a desired reduction of the operational vibration within the combustion section of the gas turbine engine.

Notably, however, although the exemplary vibration management system 200 is depicted in the above figures sensing a vibration within the combustion section 100 and applying a canceling vibration using a shaker 202 coupled to one or more components of the combustion section, in other exemplary embodiments the vibration management system 200 may be operable with any other suitable section of the gas turbine engine. For example, in other embodiments, the exemplary vibration management system 200 may be configured for sensing a vibration within a compressor section of the gas turbine engine and accordingly applying a canceling vibration using a shaker 202 coupled to one or more components of the compressor section. Similarly, in still other exemplary embodiments, the exemplary vibration management system 200 may be configured for sensing a vibration within a turbine section of the gas turbine engine and accordingly applying a canceling vibration using a shaker 202 coupled to one or more components of the turbine section.

Figure 7:
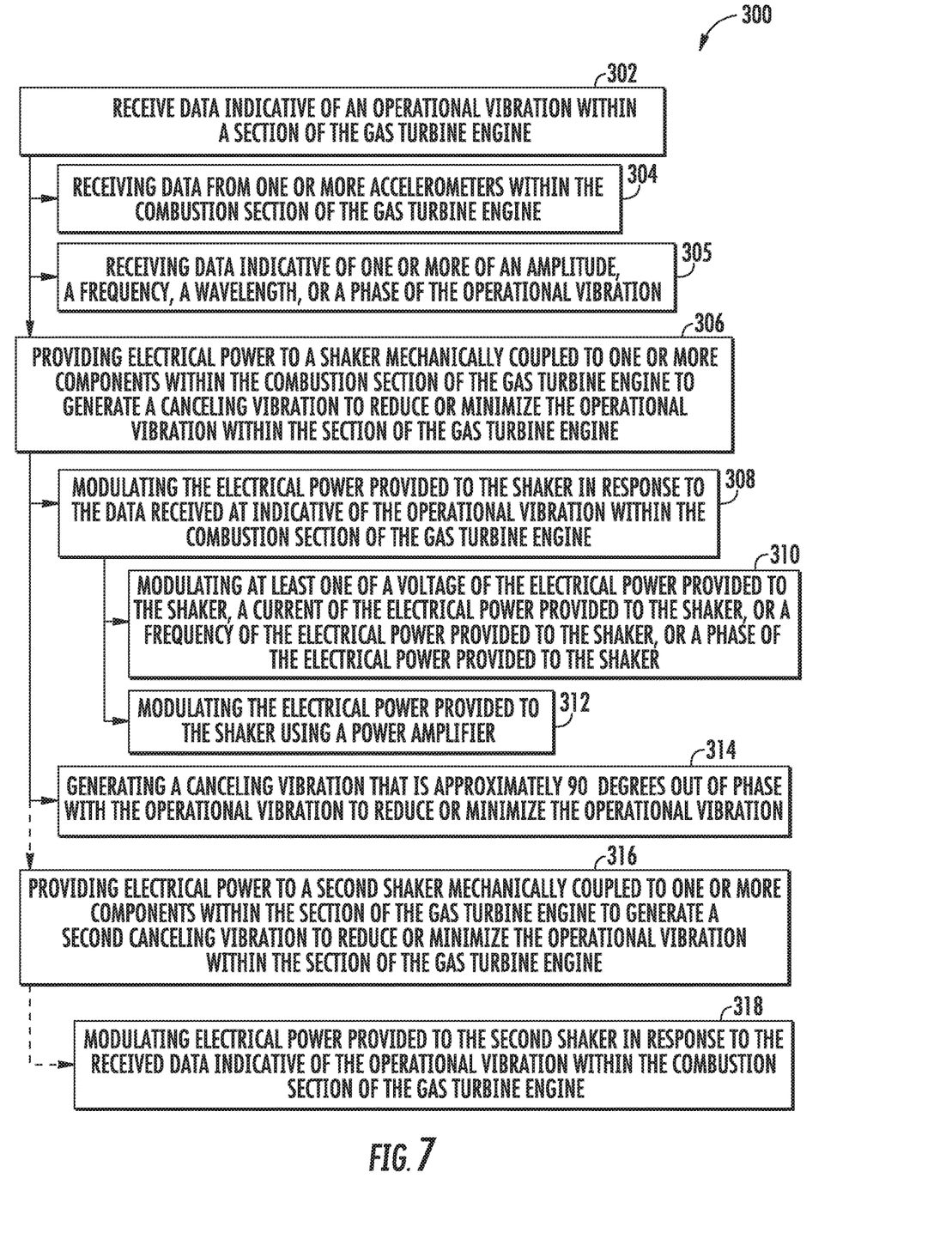
FIG. 7 is a flow diagram depicting a method for operating a gas turbine engine in accordance with an exemplary aspect of the present disclosure.

Referring now to FIG. 7, a flow diagram is provided of a method 300 for operating a gas turbine engine in accordance with an exemplary aspect of the present disclosure. The exemplary method 300 may be utilized with the exemplary gas turbine engines described above with reference to FIGS. 1 through 3, and more specifically may be utilized with more the exemplary vibration management assemblies described above with reference to FIGS. 2 through 6. Accordingly, for example, the gas turbine engine may include a compressor section, a combustion section, and a turbine section, and the vibration management assembly may include a sensor, a shaker, and a controller.

As is depicted, the exemplary method 300 generally includes at (302) receiving data indicative of an operational vibration within a section of the gas turbine engine. More specifically, for the exemplary aspect depicted, receiving data indicative of the operational vibration within the section the gas turbine engine at (302) includes at (304) receiving data from one or more accelerometers within the combustion section of the gas turbine engine. The one or more accelerometers may be configured to measure a vibration of one or more of the combustor liner of a combustor within the combustion section of the gas turbine engine, a fuel nozzle within the combustion section of the gas turbine engine, or a combustor case within the combustion section of the gas turbine engine. Notably, the measured vibration from these one or more accelerometers may be used to determine the operational vibration within the gas turbine engine. For example, it may be known through, e.g., experimental procedures, that the actual operational vibration within the gas turbine engine differs from a measured vibration of a fuel nozzle by a known factor.

Notably, however, in other exemplary aspects, receiving data indicative of the operational vibration within the section of the gas turbine engine at (302) may additionally, or alternatively, include receiving data from any other suitable sensor capable of sensing data indicative of an operational vibration of one or more components of the section of the gas turbine engine. For example, in other exemplary aspects, receiving data indicative of the operational vibration within the section of the gas turbine engine at (302) may include receiving data from one or more pressure sensors. The one or more pressure sensors may sense fluctuations in pressures within or around the one or more components of the section, which may be indicative of combustor dynamics, which may in turn be indicative of operational vibrations. Further, although in certain exemplary aspects receiving data indicative of the operational vibration within the section of the gas turbine engine at (302) may include receiving data indicative of the operational vibration within the combustion section of the gas turbine engine, in other aspects, receiving data at (302) may additionally or alternatively include receiving data indicative of an operational vibration within the turbine section of the gas turbine engine, within the compressor section of the gas turbine engine, or both.

Further, for the exemplary aspect depicted, receiving data indicative of the operational vibration within the section of the gas turbine engine at (302) additionally includes at (305) receiving data indicative of one or more of an amplitude, a frequency, a wavelength, or a phase of the operational vibration.

Referring still to FIG. 7, the exemplary method 300 further includes at (306) providing electrical power to a shaker mechanically coupled to one or more components within the section of the gas turbine engine to generate a canceling vibration to reduce or minimize the operational vibration within the section of the gas turbine engine. For the exemplary aspect depicted, providing electrical power to the shaker mechanically coupled to the one or more components within the section of the gas turbine engine at (306) includes at (308) modulating the electrical power provided to the shaker in response to the data received at (302) indicative of the operational vibration within the section of the gas turbine engine.

More specifically, for the exemplary aspect depicted, modulating the electrical power provided to the shaker at (308) includes at (310) modulating at least one of a voltage of the electrical power provided to the shaker, a current of the electrical power provided to the shaker, a frequency of the electrical power provided to the shaker, or a phase of the electrical power provided to the shaker. In at least certain exemplary aspects, modulating electrical power provided the shaker at (308) may include modulating the electrical power provided to the shaker in response to the received data indicative of the operational vibration within the section of the gas turbine engine at (302). For example, in at least certain exemplary aspects, the method 300 may determine a baseline vibration level based on the received data indicative of the operational vibration at (302), may then modulate the electrical power provided to the shaker at (308), may then determine an updated vibration level based on additional received data indicative of the operational vibration during or after the modulation at (308), and may further modulate the electrical power provided to the shaker based on a differential between the updated vibration level and the baseline vibration level (i.e., based on whether or not the updated vibration level is improved over the baseline vibration level).

Additionally, for the exemplary aspect depicted, modulating the electrical power provided to the shaker at (308) includes at (312) modulating the electrical power provided to the shaker using a power amplifier. Modulating one or more these parameters of the electrical power provided to the shaker at (310) may allow for the canceling vibration to more closely mirror the operational vibration, such that the canceling vibration may more effectively cancel out, or reduce the operational vibration during operation of the gas turbine engine. More specifically, for example, for the exemplary aspect of the method 300 depicted, providing electrical power to the shaker mechanically coupled to the one or more components within the section of the gas turbine engine at (306) further includes at (314) generating a canceling vibration that is approximately 180 degrees out of phase with the operational vibration to reduce or minimize the operational vibration.

Further, it will be appreciated that in at least certain exemplary aspects of the method 300 depicted in FIG. 7, the shaker may be a first shaker and the canceling vibration may be a first canceling vibration. With such an exemplary aspect, the method may further include, as is depicted in phantom, at (316) providing electrical power to a second shaker mechanically coupled to one or more components within the section of the gas turbine engine to generate a second canceling vibration to reduce or minimize the operational vibration within the section of the gas turbine engine. With such an exemplary aspect, providing electrical power to the second shaker mechanically coupled to the one or more components within the section of the gas turbine engine (316) may further include at (318) modulating electrical power provided to the second shaker in response to the received data indicative of the operational vibration within the section of the gas turbine engine. Accordingly, will be appreciated that with such an exemplary aspect, the first and second shakers may be utilized together to generate a combined canceling vibration designed to offset/reduce or minimize the operational vibration within the section of the gas turbine engine. However, in other exemplary aspects, the method 300 may instead sense data indicative of one or more local operational vibrations and control the plurality of shakers individually to reduce or minimize each of these respective local operational vibrations within the section of the gas turbine engine.

Additionally, it will be appreciated that for the exemplary aspect depicted, providing electrical power to the shaker at (306) may generally include operating the shaker substantially continuously during operation of the gas turbine engine. However, in other exemplary aspects, receiving data indicative of the operational vibration within the section of the gas turbine engine at (302) may further include determining the operational vibration within the section of the gas turbine engine is above a predetermined threshold, and providing electrical power to the shaker at (306) may instead include providing electrical power to the shaker in response to the determination that the operational vibration within the section of the gas turbine engine is above the predetermined threshold.

Operating a gas turbine engine in accordance with one or more of the exemplary aspects described herein may result in a longer-lasting gas turbine engine. For example, utilizing the vibration management assembly described herein may result in decreased operational vibration due to combustor dynamics during operation of the gas turbine engine, reducing premature wear of certain components within the combustion section of the gas turbine engine through high cycle fatigue of such components.

Notably, it will be appreciated that although the present disclosure is generally directed to utilizing a vibration management system having mechanical shakers to create canceling vibrations to offset operational vibrations, in other exemplary embodiments, other means may be utilized for reducing operational vibrations within, e.g., a combustion section of the gas turbine engine. For example, instead of utilizing mechanical shakers, in other exemplary embodiments, the operational vibrations may be reduced by modulating one or more aspects of a fuel flow through, e.g., a fuel manifold to a plurality of fuel nozzles within the combustion section of the gas turbine engine. For example, the system may sense an operational vibration of one or more components within, e.g., the combustion section of the gas turbine engine, and in response may modulate certain parameters of the fuel flow to the plurality of fuel nozzles to reduce such operational vibrations. For example, in certain exemplary embodiments, the system may modulate a fuel flow pressure through dedicated valves within the fuel lines (such as dedicated pulse width modulation valves), or alternatively, utilizing the fuel supply valves, to reduce operational vibrations within the combustion section of the gas turbine engine. Such modulation may be done dynamically in response to the sensed vibration of the one or more components within the combustion section. Additionally, in other embodiments, the system may modulate any other suitable parameters of the fuel flow.

Figure 8:
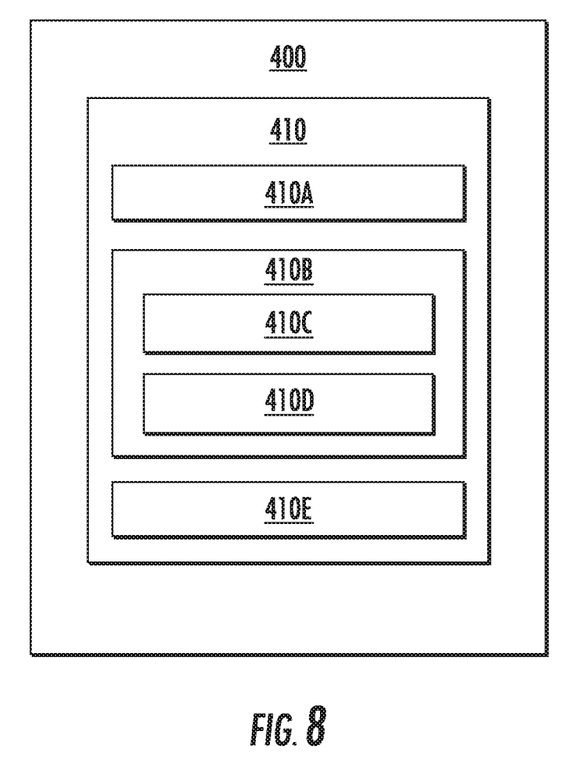
FIG. 8 is a schematic view of a control system in accordance with an exemplary embodiment of the present disclosure.

FIG. 8 depicts an example computing system 400 according to example embodiments of the present disclosure. The computing system 400 can be used, for example, as a controller in a vibration management assembly, such as the controller 204 of the vibration management assembly 200 discussed above. The computing system 400 can include one or more computing device(s) 410. The computing device(s) 410 can include one or more processor(s) 410A and one or more memory device(s) 410B. The one or more processor(s) 410A can include any suitable processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as the exemplary method 300 described above with reference to FIG. 7, or any of the operations and functions for which the computing system 400 and/or the computing device(s) 410 are configured, and/or any other operations or functions of the one or more computing device(s) 410. The instructions 410C can be software written in any suitable programming language or can be implemented in hardware. Additionally, and/or alternatively, the instructions 410C can be executed in logically and/or virtually separate threads on processor(s) 410A. The memory device(s) 410B can further store data 410D that can be accessed by the processor(s) 410A. For example, the data 410D can include data indicative of power flows, data indicative of vibrations within the engine, and/or any other data and/or information described herein.

The computing device(s) 410 can also include a network interface 410E used to communicate, for example, with the other components of system 400 (e.g., via a network). The network interface 410E can include any suitable components for interfacing with one or more network(s), including for example, transmitters, receivers, ports, controllers, antennas, and/or other suitable components. One or more external display devices (not depicted) can be configured to receive one or more commands from the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a gas turbine engine comprising:
   receiving data indicative of an operational vibration within a section of the gas turbine engine; and
   providing electrical power to a shaker mechanically coupled to one or more components of the section of the gas turbine engine to generate a canceling vibration to reduce or minimize the operational vibration within the section of the gas turbine engine;
   wherein the section of the gas turbine engine is a combustion section of the gas turbine engine,
   wherein the combustion section of the gas turbine engine includes an outer combustor case,
   wherein the shaker is mechanically coupled to the outer combustor case, and
   wherein the shaker is a rotary-style shaker including a weight attached to a rotor.

2. The method of claim 1, wherein receiving data indicative of the operational vibration within the combustion section of the gas turbine engine comprises receiving data from one or more accelerometers within the combustion section of the gas turbine engine.

3. The method of claim 2, wherein the one or more accelerometers are configured to measure a vibration of one or more of a combustor liner of a combustor within the combustion section of the gas turbine engine, a fuel nozzle within the combustion section of the gas turbine engine, a fuel manifold within the combustion section of the gas turbine engine, or a combustor case within the combustion section of the gas turbine engine.

4. The method of claim 1, wherein receiving data indicative of the operational vibration within the section of the gas turbine engine comprises receiving data indicative of at least one of a frequency, an amplitude, or a phase of the operational vibration.

5. The method of claim 4, wherein providing electrical power to the shaker mechanically coupled to one or more components of the section of the gas turbine engine to generate the canceling vibration comprises generating a canceling vibration that is out of phase with the operational vibration.

6. The method of claim 1, wherein the shaker is mechanically coupled to the outer combustor case at a location outward of the outer combustor case along a radial direction of the gas turbine engine.

7. A method for operating a gas turbine engine comprising:
receiving data indicative of an operational vibration within a section of the gas turbine engine; and
providing electrical power to a shaker mechanically coupled to one or more components of the section of the gas turbine engine to generate a canceling vibration to reduce or minimize the operational vibration within the section of the gas turbine engine;
wherein the section of the gas turbine engine is a combustion section of the gas turbine engine,
wherein the combustion section of the gas turbine engine includes an outer combustor case,
wherein the shaker is mechanically coupled to the outer combustor case, and
wherein providing electrical power to the shaker mechanically coupled to one or more components of the section of the gas turbine engine comprises modulating the electrical power provided to the shaker in response to the received data indicative of the operational vibration within the section of the gas turbine engine,
wherein modulating the electrical power provided to the shaker comprises modulating the electrical power provided to the shaker using a power amplifier.

8. The method of claim 7, wherein modulating the electrical power provided to the shaker comprises modulating at least one of a voltage of the electrical power provided to the shaker, a current of the electrical power provided to the shaker, a frequency of the electrical power provided to the shaker, or a phase of the electrical power provided to the shaker.

9. A method for operating a gas turbine engine comprising:
receiving data indicative of an operational vibration within a section of the gas turbine engine, and
providing electrical power to a shaker mechanically coupled to one or more components of the section of the gas turbine engine to generate a canceling vibration to reduce or minimize the operational vibration within the section of the gas turbine engine,
wherein the section of the gas turbine engine is a combustion section of the gas turbine engine, wherein the combustion section of the gas turbine engine includes an outer combustor case, and wherein the shaker is mechanically coupled to the outer combustor case, and
wherein the shaker is a first shaker, wherein the canceling vibration is a first canceling vibration, and wherein the method further comprises:
providing electrical power to a second shaker mechanically coupled to one or more components of the combustion section of the gas turbine engine to generate a second canceling vibration to reduce or minimize the operational vibration within the section of the gas turbine engine.

10. The method of claim 9, wherein providing electrical power to the second shaker mechanically coupled to one or more components of the combustion section of the gas turbine engine comprises modulating the electrical power provided to the second shaker in response to the received data indicative of the operational vibration within the section of the gas turbine engine.

11. The method of claim 9, wherein providing electrical power to the second shaker mechanically coupled to one or more components of the combustion section of the gas turbine engine comprises controlling the first shaker and the second shaker individually to reduce or minimize a plurality of respective local operational vibrations within the section of the gas turbine engine.

\* \* \* \* \*